(12) United States Patent
Schwartz

(10) Patent No.: US 8,710,801 B2
(45) Date of Patent: Apr. 29, 2014

(54) BATTERY COMPRISING CIRCUITRY FOR CHARGE AND DISCHARGE CONTROL, AND METHOD OF OPERATING A BATTERY

(75) Inventor: Reiner Schwartz, Forstinning (DE)

(73) Assignee: STMicroelectronics Application GmbH, Grassbrunn (DE)

( * ) Notice: Subject to any disclaimer, the term of this patent is extended or adjusted under 35 U.S.C. 154(b) by 354 days.

(21) Appl. No.: 13/242,649

(22) Filed: Sep. 23, 2011

(65) Prior Publication Data

US 2012/0074898 A1 Mar. 29, 2012

(30) Foreign Application Priority Data

Sep. 23, 2010 (IT) .............................. VI2010A000258

(51) Int. Cl.
*H01M 10/44* (2006.01)
*H01M 10/46* (2006.01)

(52) U.S. Cl.
USPC ........................................................ 320/119

(58) Field of Classification Search
USPC .................. 320/103, 107, 112, 116, 118, 119
See application file for complete search history.

(56) References Cited

U.S. PATENT DOCUMENTS

| | | | |
|---|---|---|---|
| 5,631,534 A * | 5/1997 | Lewis | 320/103 |
| 5,744,936 A | 4/1998 | Kawakami | |
| 5,773,962 A | 6/1998 | Nor | |
| 5,898,291 A | 4/1999 | Hall | |
| 6,140,799 A | 10/2000 | Thomasson | |
| 7,564,217 B2 * | 7/2009 | Tanigawa et al. | 320/118 |
| 8,294,421 B2 * | 10/2012 | Bucur et al. | 320/116 |
| 2006/0103351 A1 | 5/2006 | Tanigawa et al. | |

FOREIGN PATENT DOCUMENTS

EP 0609101 A1 8/1994

* cited by examiner

*Primary Examiner* — Edward Tso
(74) *Attorney, Agent, or Firm* — Seed IP Law Group PLLC

(57) ABSTRACT

A battery includes a battery module that includes a plurality of submodules electrically connected in series. Each submodule comprises first and second submodule terminals and a cell. At least one submodule in each battery module is a switchable submodule comprising a submodule switching circuit. The submodule switching circuit is switchable between a first state and a second state. The submodule switching circuit electrically connects the cell of the switchable submodule between the first and second submodule terminals when the submodule switching circuit is in the first state. The submodule switching circuit provides an electrical bypass connection between the first and second submodule terminals and the cell of the switchable submodule is electrically disconnected from at least one of the first and second submodule terminals when the switching circuit is in the second state. The battery further comprises a control unit for operating the switching circuit of each module.

13 Claims, 4 Drawing Sheets

BATTERY COMPRISING CIRCUITRY FOR CHARGE AND DISCHARGE CONTROL, AND METHOD OF OPERATING A BATTERY

BACKGROUND

1. Technical Field

The present disclosure generally relates to battery power sources, in particular to batteries comprising circuitry for charge and discharge control, and to methods of operating batteries.

2. Description of the Related Art

Rechargeable batteries are used as a power source for various devices, from small devices having a relatively low power consumption such as mobile phones, digital cameras and media players to devices having a high power consumption and/or using a voltage of up to several hundred volts such as electric vehicles and hybrid vehicles, for example electric and hybrid cars. Besides lead acid batteries, nickel cadmium batteries, and nickel metal hydride batteries, lithium ion batteries have recently gained popularity, due to their high energy to weight ratio, absence of memory effect and slow loss of charge when not in use.

In applications wherein a voltage that is greater than the voltage of a single cell (approximately 2 volts for a lead acid battery cell, 1.2 volts for nickel cadmium and nickel metal hydride battery cells, and approximately 3.6 volts for lithium ion battery cells), a plurality of cells are electrically connected in series. For achieving higher operating voltages of about 200 to about 300 volts or more, as may be used in electric or hybrid car applications, a large number of cells are electrically connected in series.

Battery cells can be damaged when they are used outside an allowable voltage range, both when they are charged to a voltage that is greater than a maximum allowed voltage, and when they are deeply discharged, such that the voltage between the poles of the cell is smaller than a particular minimum voltage. In particular, lithium ion cells can be susceptible to damage outside of an allowable voltage range.

In a battery comprising a plurality of cells, the individual cells can have a different capacity, for example due to production tolerances, uneven temperature distribution in the battery, and differences in the aging characteristics of individual cells. Moreover, the individual cells in a battery can have a different state of charge, due to fluctuations that may occur in the charge or discharge process of the battery.

If there is a degraded cell in the battery having a diminished capacity, or a cell having a higher state of charge than the other cells, there is a danger that once this cell has reached its full charge during a charging process of the battery, it will be subject to overcharging until the other cells of the battery reach their full charge. The result can be temperature and pressure build up and possible damage of the cell. During discharging of the battery, a cell having a smaller capacity than the other cells, or a lower state of charge, will have the greatest depth of discharge and will tend to fail before the other cells. It is even possible for the voltage on the cells having the lowest state of charge and/or the smallest capacity to be reversed as they become fully discharged before the rest of the cells, which may lead to an early failure of these cells.

For overcoming these problems, it has been proposed to balance the charge of the individual cells in a battery, using specific charge balancing circuits connected to the cells of a battery and/or incorporated into the battery.

A further issue that may occur in the operation of batteries, in particular in the operation of lithium ion batteries, is avoiding an overcharge or a deep discharge of the entire battery. For this purpose, and also for controlling charge balancing processes, batteries comprising a plurality of individual cells, in particular lithium ion batteries are provided with a battery control circuit. A battery control circuit according to the state of the art will be described with reference to FIG. 1.

FIG. 1 shows a schematic circuit diagram of a battery 100 comprising a stack 103 of cells 104, 105, 106, 107. In addition to cells 104-107, further cells can be provided, as schematically indicated by dots between cell 106 and cell 107. In FIG. 1, cells 104 to 107 are denoted by common circuit symbols, wherein a longer line denotes the positive pole of the cells 104 to 107, and a shorter line denotes the negative pole of the cells 104 to 107.

The negative pole of the stack 103 is connected to a negative terminal 102 of the battery 100. The positive pole of the stack 103 is connected to a drain 114 of a discharge field effect transistor 110 (abbreviated as "DFET" in the following). A source 113 of the DFET 110 is connected to a source 112 of a charge field effect transistor 109 (abbreviated as "CFET" in the following), whose drain 111 is connected to a positive terminal 101 of the battery 100. Hence, the DFET 110 and the CFET 109 are electrically connected in series between the positive pole of the stack 103 and the positive terminal 101.

The CFET 109 and the DFET 110 can be power metal oxide semiconductor transistors. In some batteries according to the state of the art, the CFET 109 and the DFET 110 can be n-channel transistors, wherein the sources 112, 113 and drains 111, 114 are n-doped, and the body of CFET 109 and DFET 110 is p-doped. While the body of CFET 109 and DFET 110 is internally connected to the source of the respective transistor, the pn-transition between the body and the drain has a rectifying property, as schematically illustrated by diode symbols 117, 118. Note, that diodes 117, 118 are not circuit elements that are provided in addition to CFET 109 and DFET 110, but are part of an equivalent circuit illustrating features of CFET 109 and DFET 110.

CFET 109 and DFET 110 can be controlled by applying a voltage to gate 115 of CFET 109 and gate 116 of DFET 110.

In the normal operation, both CFET 109 and DFET 110 are switched on. Thus, the battery 100 can be charged and discharged through CFET 109 and DFET 110. For preventing an overcharge or a deep discharge of the cells 104-105 in stack 103, CFET 109 and/or DFET 110 can be switched off. Thus, current flow in and out of the stack 103 can be prevented.

For controlling the operation of CFET 109 and DFET 110, a control unit 108 can be connected to gates 115, 116 of CFET 109 and DFET 110. Additionally, the control unit 108 can comprise circuitry for performing charge balancing between cells 104 to 107, as schematically illustrated by connections between each of the cells 104-107 and the control unit 108.

If the CFET 109 and the DFET 110 are switched off, the voltage of the entire stack 103 is applied at the DFET 110 in the reverse direction of diode 118, and a charging voltage applied between the positive 101 and negative 102 terminal of the battery 100 is applied in the reverse direction of the diode 117 of CFET 109. For preventing an undesirable charging or discharging of the battery 100 and/or a destruction of CFET 109 and DFET 110, the breakdown voltage of CFET 109 and DFET 110 has to be greater than the voltage of the entire stack of cells 103 and the voltage that is applied when the battery 100 is charged.

A problem of the battery 100 according to the state of the art is, that if the stack 103 comprises a large number of cells 104-107, the voltage of the stack 103 and the voltage that is applied when the battery 100 is charged can be relatively high (several hundred volts or more), which can make it difficult, if not impossible, to provide CFET 109 and DFET 110 with a sufficiently high breakthrough voltage.

Therefore, it has been proposed to omit the function of a separate charge and discharge control for a high voltage battery such as a battery for an electric or hybrid vehicle.

However, in this case, the battery has to be dimensioned in way that the battery is operated in a range between about 40 percent and about 80 percent of its total capacity to ensure the functionality over the lifetime of the battery. Moreover, the lifetime of the battery may be adversely affected, since the battery has to be replaced after the capacity of the battery has decreased to 80 percent of the starting capacity.

BRIEF SUMMARY

Some embodiments of the present disclosure are a battery and a method of operating a battery that allows overcoming these problems.

A battery according to one embodiment of the present disclosure comprises at least one battery module. Each battery module comprises a plurality of submodules electrically connected in series. Each submodule comprises a first and a second submodule terminal and at least one cell. At least one submodule in each battery module is a switchable submodule comprising a submodule switching circuit. The submodule switching circuit is switchable between a first state and a second state. The submodule switching circuit electrically connects the at least one cell of the switchable submodule between the first and the second submodule terminal of the switchable submodule when the submodule switching circuit is in the first state. The submodule switching circuit provides an electrical bypass connection between the first and the second submodule terminal of the switchable submodule and the at least one cell of the switchable submodule is electrically disconnected from at least one of the first and the second submodule terminal when the switching circuit is in the second state. The battery further comprises a control unit for operating the switching circuit in the at least one switchable submodule of each module.

If the submodule switching circuit of a switchable submodule is in the first state, a current can flow between the cell of the switchable submodule and adjacent submodules of the battery module through the first and the second submodule terminal. Thus, the cell of the switchable submodule can be charged, when the battery is charged, and discharged, when the battery is discharged.

If the submodule switching circuit is in the second state, there is substantially no current flow between the cell of the switchable submodule and the cells of adjacent submodules. However, current flow between submodules neighboring the switchable submodule is possible through the electrical bypass connection.

Hence, in a battery according to the present disclosure, submodules comprising one or more cells can be selectively connected and disconnected from the stack of cells of the battery Switching elements such as, for example, transistors provided in the submodule switching circuits need to withstand only the voltage of the one or more cells of the respective submodule, but need not withstand the voltage of the entire stack of cells.

In some embodiments, the submodule switching circuit in each switchable submodule comprises a first field effect transistor and a second field effect transistor. A source of the first field effect transistor is electrically connected to the second submodule terminal of the respective switchable submodule and a negative pole of the at least one cell of the respective switchable submodule. A drain of the first field effect transistor is electrically connected to the first submodule terminal of the respective switchable submodule. A source of the second field effect transistor is electrically connected to the first submodule terminal. A drain of the second field effect transistor is electrically connected to a positive pole of the at least one cell of the switchable submodule. The control unit is adapted for operating the first and the second field effect transistor by applying a first gate voltage to a gate of the first field effect transistor and a second gate voltage to a gate of the second field effect transistor.

If the first field effect transistor is switched on by the control unit, the first field effect transistor provides an electrical bypass connection between the first and the second submodule terminal of the switchable submodule. If the second field effect transistor is on, the second field effect transistor electrically connects the at least one cell of the switchable submodule between the first and the second submodule terminal. Hence, electrically connecting the at least one cell of the switchable submodule between the first and the second submodule terminal and providing an electrical bypass connection between the first and the second submodule terminal and disconnecting the at least one cell of the switchable submodule from the battery can alternatively be performed by switching one of the first and the second field effect transistor on, and switching the other of the first and the second field effect transistor off.

In some embodiments, each battery module comprises at least one non-switchable submodule, wherein the at least one cell of each non-switchable submodule is electrically connected between the first and the second submodule terminal.

Providing non-switchable sub-modules can reduce the complexity of the circuitry of the battery, and may help to reduce an internal resistance of the battery, since no switching elements such as field effect transistors need to be connected between the first and/or the second submodule terminal of the non-switchable submodule terminal and the at least one cell of the non-switchable submodule.

In some embodiments, each submodule in each battery module is a switchable submodule. Thus, a more flexible connection and disconnection of individual submodules can be performed.

In some embodiments, the control unit is adapted for detecting a short circuit between poles of the battery, and for switching each submodule in each battery module into the second state when a short circuit is detected. Thus, the battery can be protected against adverse effects of short circuits such as an excessive creation of heat in the battery and a quick discharging of the battery. Thereby, no switching elements that can resist the voltage of the entire battery are required.

In some embodiments, each battery module comprises a battery balancing circuit adapted for balancing a state of charge of the cells of the plurality of submodules of the respective battery module.

By switching the submodule switching circuit of one or more of the switchable submodules into the second state, the cells of these switchable submodules can maintain their state of charge, while the cells in other submodules of the battery submodule are charged or discharged. Thus, the total amount of charge stored in the cells of the battery module can be changed relative to other battery modules of the battery, which can used for charge balancing purposes between the battery modules. The battery balancing circuit can help to provide a substantially equal state of charge of the individual cells in one battery module, such that an overcharging or deep discharge of individual cells can be avoided.

In some embodiments, the battery comprises a plurality of battery modules and the control unit is adapted for switching at least one switchable submodule of at least one of the plurality of battery modules from the first state into the second state if a voltage and/or a state of charge of cells in the at least one battery module is greater than at least one threshold value during a charge process of the battery or smaller than at least one threshold value during a discharge process of the battery.

Thus, the charging of the at least one of the plurality of battery modules (during the charge process) or the discharge of the at least one of the plurality of battery modules (during the discharge process) can be slowed down compared to the charge or discharge of other battery modules. This can be used for charge balancing between the battery modules of the battery.

In some embodiments, the battery comprises a plurality of battery modules and the control unit is adapted for switching at least one switchable submodule of a second subset of the plurality of battery modules from the first state into the second state if a voltage and/or a state of charge of cells of a first subset of the plurality of battery modules comprising battery modules which are not in the first subset is greater than at least one threshold value during a discharge process of the battery or is smaller than at least one threshold value during a charge process of the battery.

Hence, the state of charge of the cells of the first subset can be decreased to a greater extent than the state of charge of the second subset during discharge, or increased to a greater extent than the state of charge of the second subset during the charge process. This also can be employed for balancing the state of charge of the individual battery modules.

In some embodiments, the battery can further comprise a current sense module adapted for measuring a an amperage of a current through the at least one battery module, wherein the control unit is adapted for operating the submodule switching circuits of the switchable submodule on the basis of the measured current flow. Thus, the amount of charge provided to the battery modules and submodules can be controlled.

In some embodiments, each submodule switching circuit comprises at least one switching element for electrically connecting and disconnecting the at least one cell of the switchable submodule from at least one of the first and the second submodule terminal, wherein a breakthrough voltage of the at least one switching element is smaller than a sum of the voltages of all cells of the battery in a charged state.

A method of operating a battery, wherein the battery comprises a plurality of battery modules, each battery module comprising a plurality of submodules electrically connected in series, each submodule comprising a first and a second submodule terminal and at least one cell according to one embodiment of the present disclosure comprises selecting a subset of the plurality of submodules of at least one of the battery modules. The at least one cell of each submodule in the subset is electrically disconnected from at least one of the first and the second submodule terminal of the respective submodule, and an electrical bypass connection is provided between the first and the second submodule terminal of each submodule in the subset.

In some embodiments, a voltage and/or a state of charge of each of the plurality of battery modules is determined during a discharge process of the battery. The subset is selected on the basis of the determined voltage and/or state of charge. The subset comprises one or more battery modules having a voltage and/or state of charge that is lower than a threshold value. Thus, the state of charge of the battery modules of the subset is decreased to a smaller extent than the state of charge of other battery modules during the discharge process of the battery.

In some embodiments, a voltage and/or a state of charge of each of the plurality of battery modules is determined during a charge process of the battery. The subset is selected on the basis of the determined voltage and/or state of charge. The subset comprises one or more battery modules having a voltage and/or state of charge that is higher than a threshold value. Thus, the state of charge of the battery modules in the subset is increased to a smaller extent than the state of charge of other battery modules during the charge process.

In some embodiments, a short circuit connection is detected between a positive and a negative pole of the battery. The subset is selected to comprise each cell in the battery if a short circuit connection is detected. Thus, a high current flow caused by the short circuit can be avoided.

In some embodiments, a charge balancing process can be performed among the cells of the plurality of submodules of one of the battery modules. Thus, a substantially equal state of charge of the individual cells in a battery module can be provided.

BRIEF DESCRIPTION OF THE SEVERAL VIEWS OF THE DRAWINGS

Embodiments of the present disclosure will now be described with respect to the figures, wherein.

DETAILED DESCRIPTION

Figure 1:
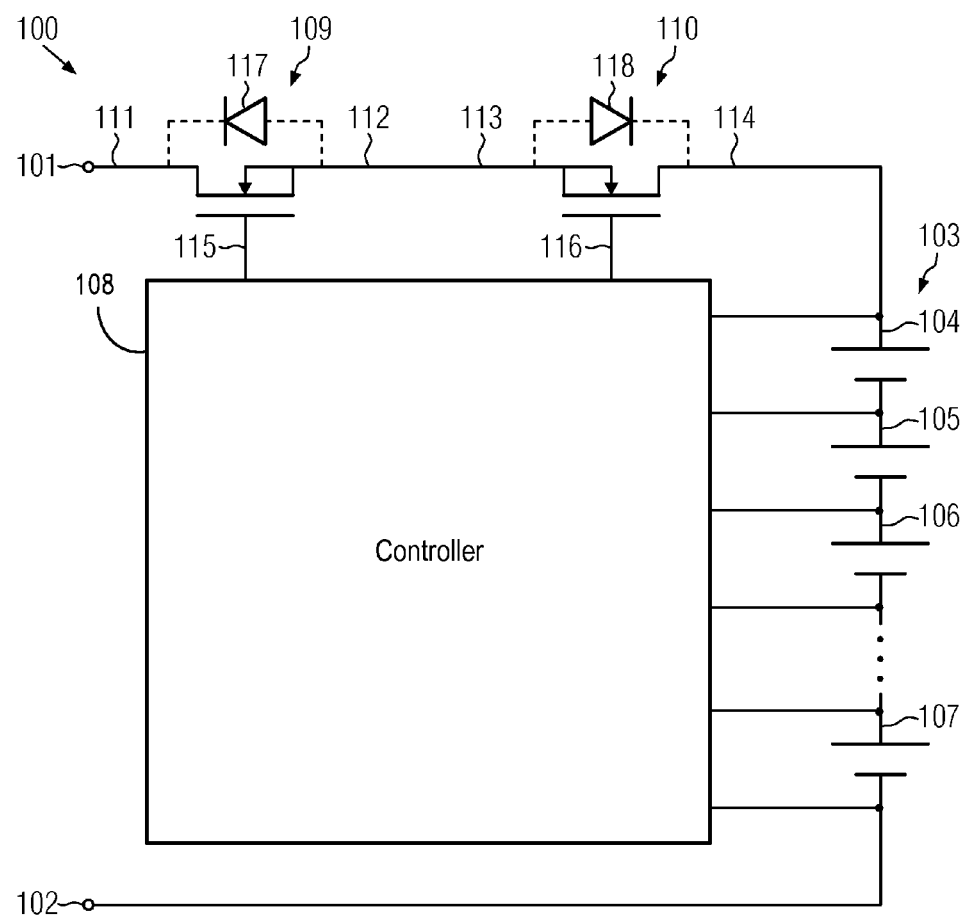
FIG. 1 shows a schematic circuit diagram of a battery according to the state of the art.
Figure 2:
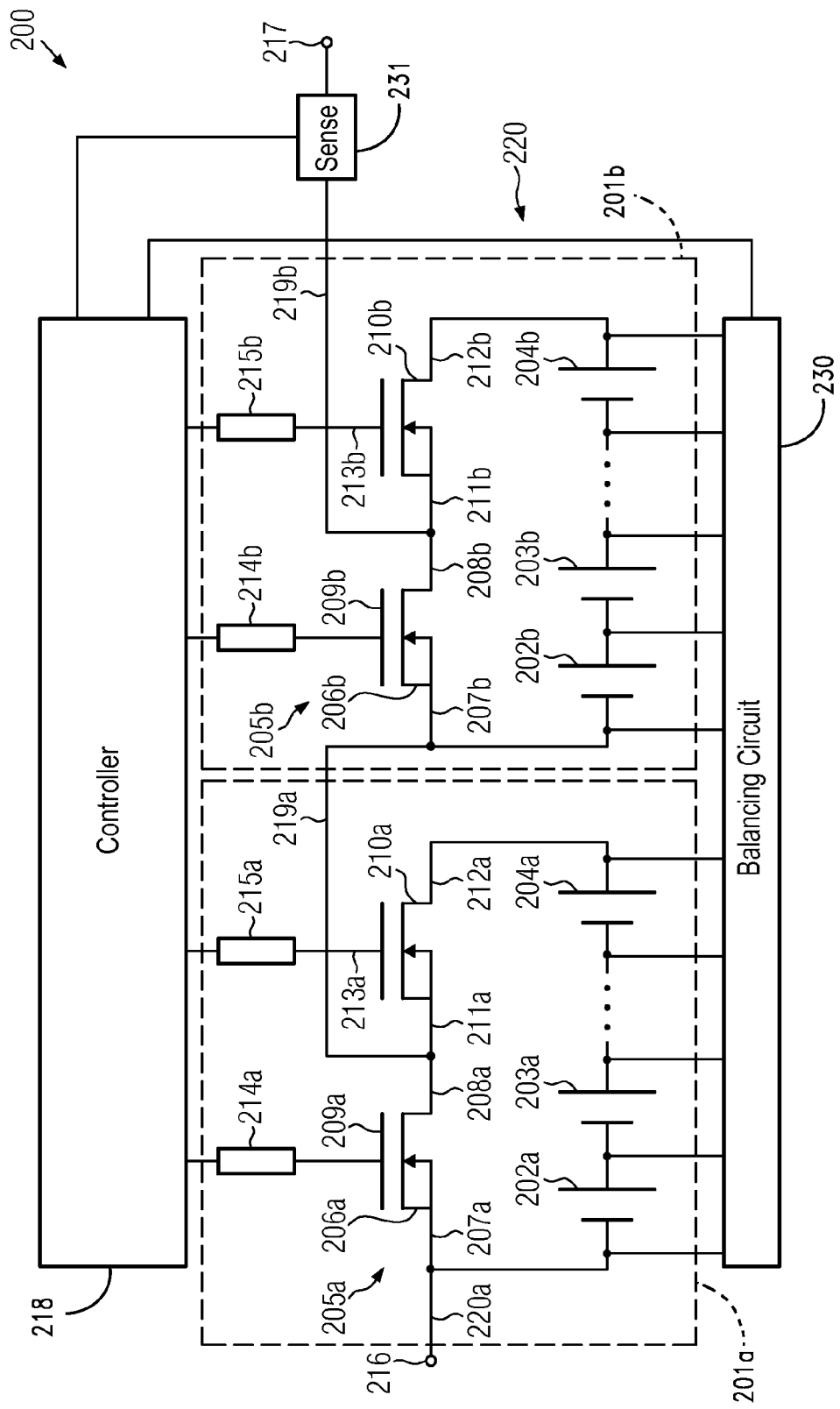
FIG. 2 shows a schematic circuit diagram of a battery according to the present disclosure.

FIG. 2 shows a schematic circuit diagram of a battery 200 according to an embodiment of the present disclosure.

The battery 200 comprises a battery module 220. The battery module 220 comprises a first submodule 201a and a second submodule 201b. In FIG. 2, the first submodule 201a and the second submodule 201b are enclosed by dotted lines.

The battery submodule 201a comprises a first submodule terminal 219a and a second submodule terminal 220a. The submodule terminals 219a, 220a can, in some embodiments, be provided in the form of wires, circuit paths on a printed circuit board, pins of a housing of an integrated circuit, plugs or jacks, or as pins or electric contacts in a plug or jack.

The submodule 201a further comprises cells 202a, 203a, 204a. While three cells are shown in FIG. 2, in other embodiments, the submodule 201a can comprise a different number of cells. In some embodiments, the submodule 201a can comprise a single cell, or two cells. In further embodiments, the submodule 201a can comprise more than three cells, as schematically indicated by dots between cells 203a, 204a. In embodiments wherein the submodule 201a comprises more than one cell, the cells 202a, 203a, 204a of the submodule 201a are electrically connected in series.

In some embodiments, each of the cells 202a, 203a, 204a, 202b, 203b, 204b of the battery 200 can be a lithium ion cell. In other embodiments, the cells 202a, 203a, 204a, 202b, 203b, 204b can be cells of a type other than lithium ion cells, wherein, however, all cells in the battery 200 usually are of the same type. Examples of cell types that can be used in the battery 200 as an alternative to lithium ion cells include lead acid cells, nickel cadmium cells and/or nickel metal hydride cells.

Each of the cells 202a, 203a, 204a comprises a positive pole and a negative pole. In FIG. 2, the cells 202a, 203a, 204a are denoted by conventional circuit symbols, wherein each cell is denoted by two lines, the longer line denoting the positive pole, the shorter line denoting the negative pole. In embodiments wherein submodule 201a comprises a plurality of cells as shown in FIG. 2, the cells 202a, 203a, 204 are electrically connected in series, and form a stack of cells.

A negative pole of the stack of cells 202a, 203a, 204a of the submodule 201a is electrically connected to the second submodule terminal 220a. In embodiments wherein the submodule 201 comprises a single cell, the negative pole of the cell is connected to the second submodule terminal 220.

The submodule 201a further comprises a submodule switching circuit 205a. The submodule switching circuit 205a comprises a first field effect transistor 206a and a second field effect transistor 210a. The first field effect transistor 206a comprises a source 207a, a drain 208a, and a gate 209a. The second field effect transistor 210a comprises a source 211a, a drain 212a and a gate 213a. The source 207a of the first transistor 206a is electrically connected to the second submodule terminal 220a and to the negative pole of the stack of cells 202a, 203a, 204a, or the single cell, respectively. The drain 208a of the first field effect transistor 206a is electrically connected to the first submodule terminal 219a of the submodule 201a.

The source 211a of the second field effect transistor 210a is electrically connected to the drain 208a of the first field effect transistor 206a and the first submodule terminal 219a.

The gate 209a of the first field effect transistor 206a is connected to a control unit 218 via resistor 214a, and the gate 213a of the second field effect transistor 210a is electrically connected to the control unit 218 via resistor 215a. The control unit 218 can apply a first gate voltage to the gate 209a of the first field effect transistor 206a via resistor 214a, and can apply a second gate voltage to the gate 213a of the second field effect transistor 210a via resistor 215a. Thus, the control unit 218 can switch each of the first field effect transistor 206a and the second field effect transistor 210a between an "on" state and an "off" state by varying the first and the second gate voltage. In the "on" state, each of the field effect transistors 206a, 210a is electrically conductive for a current flowing from its drain 208a, 212a to its source 207a, 211a, wherein current directions are denoted by the technical current direction. In the "off" state, field effect transistors 206a, 210a are electrically nonconductive, at least for currents flowing in a direction from their drains 212a, 208a to their sources 207a, 211a.

The submodule switching circuit 205a is switchable between a first state and a second state. In the first state, the first field effect transistor 206a is in the "off" state. Thus, the first field effect transistor 206a substantially prevents a current flow through the first field effect transistor 206a from the first submodule terminal 219a to the second submodule terminal 220a.

In the first state of the submodule switching circuit 205a, the second field effect transistor 210a is in the "on" state. Thus, a current from the cells 202a, 203a, 204a can flow through the second field effect transistor 210a to the first submodule terminal 219a. Since, as detailed above, the negative pole of the stack of cells 202a, 203a, 204a, is electrically connected to the second submodule terminal 220a, in the first state of the submodule switching circuit 205a, the cells 202a, 203a, 204a are electrically connected between the first submodule terminal 219a and the second submodule terminal 220a. In embodiments wherein the submodule 201a comprises a single cell, in the first state of the submodule switching circuit 205a, this cell is electrically connected between the submodule terminals 219a, 220a.

In the second state of the submodule switching circuit 205a, the first field effect transistor 206a is in the "on" state, and the second field effect transistor 210a is in the "off" state. Thus, an electrical current can flow between the first submodule terminal 219a and the second submodule terminal 220a through the first field effect transistor 206a, whereas the second field effect transistor 210a substantially prevents a current flow from the cells 202a, 203a, 204a through the second field effect transistor 210a. Thus, in the second state of the submodule switching circuit 205a, the cells 202a, 203a, 204a are electrically disconnected from the first submodule terminal 219a, and the first field effect transistor 206a provides an electrical bypass connection between the first submodule terminal 219a and the second submodule terminal 220a.

The control unit 218 can be configured for operating the submodule switching circuit 205a to switch the submodule switching circuit 205a between the first and the second state. For this purpose, the control unit 218a can appropriately control the gate voltages applied to the gate electrodes 209a, 213a of the first field effect transistor 206a and the second field effect transistor 210a.

The submodule 201b can have features corresponding to those of the submodule 201a. In FIG. 2, components of the submodule 201b corresponding to those of the submodule 201a are denoted by like reference numerals, with the exception of a trailing "b" instead of the trailing "a" used for components of submodule 201a. Features of components of the submodule 201b can correspond to those of components of the submodule 201a denoted by corresponding reference numerals. The control unit 218 can be adapted for operating both the submodule switching circuit 205a of the submodule 201a and the submodule switching circuit 205b of the submodule 201b.

The present disclosure is not restricted to embodiments wherein the battery module 220 comprises two submodules 201a, 201b. In other embodiments, the battery module 220 can comprise three or more submodules having features corresponding to those of submodules 201a, 201b, wherein the first submodule terminal of each submodule is electrically connected to a second submodule terminal of an adjacent submodule, with the exception of the first and the last submodule, wherein the second submodule terminal of the first submodule is connected to a negative pole 216 of the battery module 220, and the first submodule terminal of the last submodule is electrically connected to a positive pole 217 of the battery module.

The battery module 220 can further comprise a battery balancing circuit 230. The battery balancing circuit 230 can be electrically connected to each of the cells 202a, 203a, 204a, 202b, 203b, 204b of the battery module 220, and can be adapted for balancing charge between the cells 202a, 203a, 204a, 202b, 203b, 204b of the battery module 220.

The battery balancing circuit 230 can be a passive or an active balancing circuit. In passive charge balancing circuits, individual cells can be connected to a resistive path comprising a bypass resistor. In doing so, energy from the cell is converted to heat in the bypass resistor, and thus is lost for the battery. In active balancing circuits, energy from one or more cells is temporarily stored in a capacitor, in an inductivity or in a transformer, and then returned to one or more other cells of the battery. Thus, a loss of energy can be reduced. Examples of battery balancing circuits will be described in more detail below.

The battery 200 can further comprise a current sense module 231 adapted for measuring an electric current flowing through the battery 200.

The battery balancing circuit 230 and the current sense module 231 can be connected to the control unit 218. Thus, the control unit can operate the submodule switching circuits 205a, 205b on the basis of the current measured by the current sense module 231, and can also control the charge balancing performed by the battery balancing circuit 230. In some embodiments, the battery module 220 can comprise means for measuring a voltage of the cells 202a, 203a, 204a, 202b, 203b, 204b of each of the submodules 201a, 201b, optionally for measuring the voltage of each cell separately. Thus, charge balancing between the cells 202a, 203a, 204a, 202b, 203b, 204b can be performed on the basis of the measured voltages.

The present disclosure is not limited to embodiments wherein the battery 200 comprises a single battery module 220. In other embodiments, the battery 200 can comprise a plurality of battery modules that are electrically connected in series, each having features corresponding to those of battery module 220 described above. In particular, each of the battery modules can comprise submodules similar to submodules 201a, 201, and a battery balancing circuit similar to battery balancing circuit 230 described above. The control unit 218 can be adapted for operating the submodule switching circuits of the submodules of each of the battery modules of the battery 200, and for operating the battery balancing circuits of each of the battery modules.

In FIG. 2, an embodiment of the battery 200 wherein each of the submodules 201a, 201b comprises a submodule switching circuit 205a, 205b is shown. However, the present disclosure is not limited to such embodiments. In other embodiments, each battery module can comprise one or more non-switchable submodules, in addition to one or more switchable submodules having features corresponding to those of submodules 201a, 201b described above. In the non-switchable submodules, the one or more cells of each submodule are electrically connected between the first submodule terminal and the second submodule terminal, and the submodule switching circuits are omitted in the non-switchable submodules.

The field effect transistors 206a, 210a, 206b, 210b can have a breakthrough voltage. If a voltage that exceeds the breakthrough voltage is applied between the drain and the source of one of the field effect transistors 206a, 210a, 206b, 210b, the respective field effect transistor can become electrically conductive even if it is in the "off" state, or the field effect transistor can be even destroyed. The breakthrough voltage of each of the field effect transistors 206a, 210a, 206b, 210b is greater than the voltage of the stack of cells in one of the submodules 201a, 201b, or, in embodiments wherein the submodules 201a, 201b comprise a single cell, the voltage of the cell. Thus, when the transistors 206a, 210a, 206b, 210b are in the "off" state, they prevent a current flow from the stack of cells of the respective submodule through the transistor. However, the breakthrough voltage of the transistors 206a, 210a, 206b, 210b can be smaller than the voltage between a positive pole and a negative pole of the battery 200, which can be substantially equal to the sum of the voltages of each of the cells in the battery 200. In the operation of the battery 200, the transistors 206a, 210a, 206b, 210b need not withstand such a high voltage.

The present disclosure is not restricted to embodiments wherein the submodule switching circuits 205a, 205b comprise field effect transistors which are electrically connected as detailed above. In other embodiments, the submodule switching circuits can comprise switching elements of a different type, for example solid state switches other than field effect transistors, such as bipolar transistors or IGBTs. In still further embodiments, the submodule switching circuits can comprise electromechanical switches, such as, for example, relays. In still further embodiments, the submodule switching circuits 205a, 205b can comprise field effect transistors which are connected in a manner different from that described above, as long as the submodule switching circuit has a first and a second state as described above.

Figure 3:
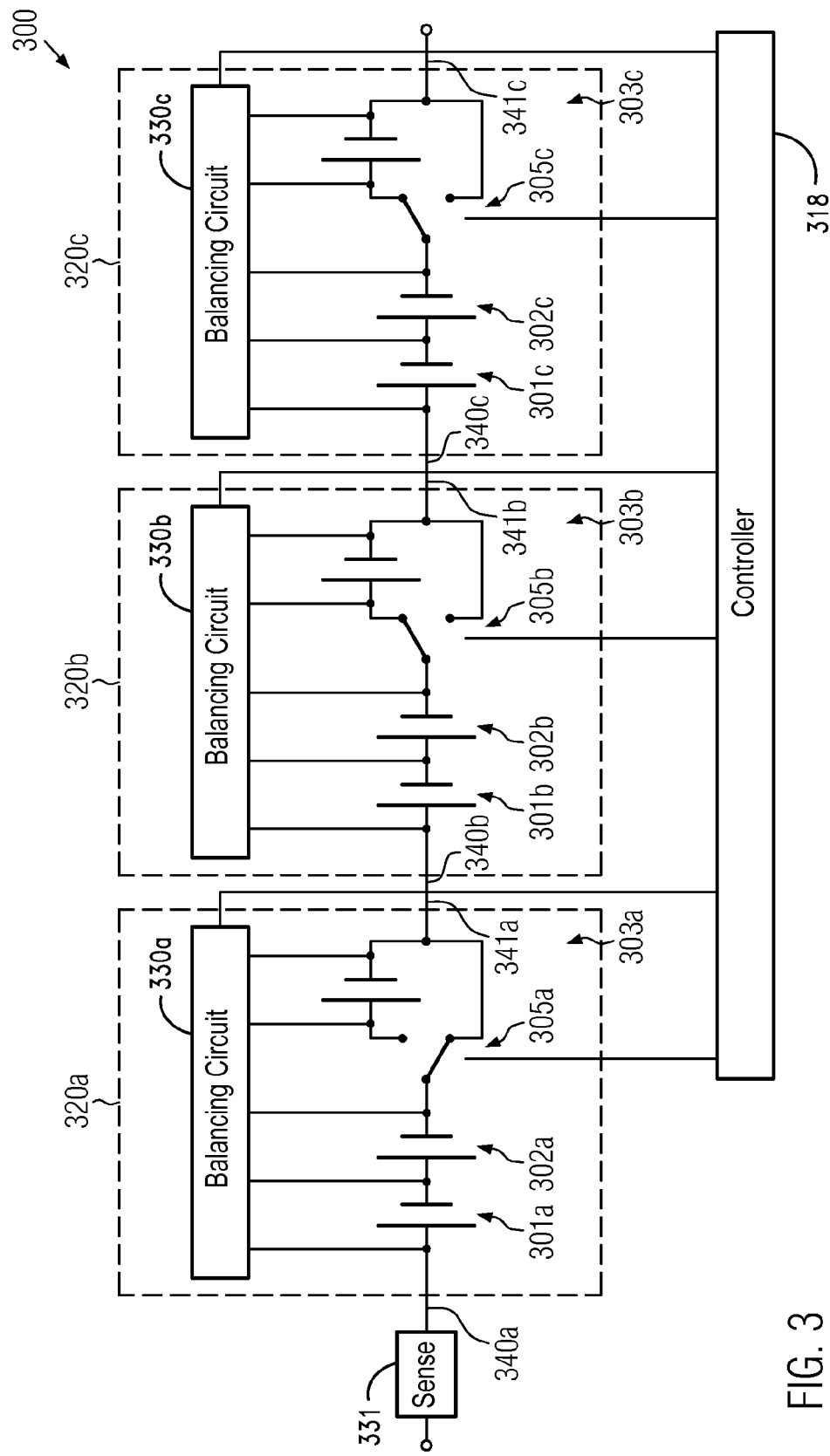
FIG. 3 shows another schematic circuit diagram of a battery according to the present disclosure.

FIG. 3 shows a simplified circuit diagram of a battery 300 according to an embodiment of the present disclosure. Unless explicitly mentioned otherwise, features of the battery 200 described above with reference to FIG. 2 can also be provided in the battery 300. Compared to FIG. 2, the circuit diagram of FIG. 3 has a higher level of abstraction, and some features have been omitted for increasing the clarity of the figure. However, this has been done merely for the clarity of illustration, and does not mean that such features are absent. Instead, unless explicitly stated otherwise, features of the battery 200 described above with reference to FIG. 2 can also be provided in the battery 300.

The battery 300 can comprises three battery modules 320a, 320b, 320c. In other embodiments, a different number of battery modules, each having features corresponding to those of battery modules 320a, 320b, 320c can be provided.

The battery module 320a can comprise three submodules 301a, 302a, 303a. In other embodiments, a different number of submodules can be provided.

Each submodule 301a, 302a, 303a comprises at least one cell. In some embodiments, each of the submodules 301a, 302a, 303a can comprise a single cell. In other embodiments, each of the submodules 301a, 302a, 303a can comprise a stack of two or more cells.

The submodules 301a and 302a are non-switchable submodules, wherein the at least one cell of the submodule is electrically connected between a first and a second submodule terminal. The submodule 303a is a switchable submodule that comprises a submodule switching circuit 305a. The submodule switching circuit 305a is switchable between a first state and a second state. When the submodule switching circuit 305a is in the first state, the submodule switching circuit 305a electrically connects the at least one cell of the submodule 303a between the first and the second submodule terminal of the submodule 303a. When the submodule switching circuit 305a is in the second state, the submodule switching circuit 305a provides a bypass connection between the first and the second submodule terminal of the submodule 303a, and at least one pole of the one or more cells of the submodule is electrically disconnected from the submodule terminals.

In FIG. 3, the submodule switching circuit 305a is illustrated using the circuit symbol of a double throw switch. Submodule switching circuit 305a is depicted as being in the second state, wherein a bypass connection between the submodule 302a and the adjacent battery module 320b is provided. Submodule switching circuits 305b, 305c in battery modules 320b, 320c are depicted as being in the first state.

Features of the switchable submodule 303a can correspond to those of submodules 201a, 201b described above with reference to FIG. 2. In particular, the submodule switching circuit 305a can comprise a first and a second field effect transistor, connected with each other and to a control unit 318 in a manner similar to that described above for field effect transistors 206a, 210a. In other embodiments, the submodule switching circuit 305a can have a different configuration, as mentioned above in the context of the description of submodule switching circuits 205a, 205b.

The battery module 320a can further comprise a battery balancing circuit 330a that can have features corresponding to those of battery balancing circuit 230 described above with reference to FIG. 2.

The features of battery modules 320b, 320c can correspond to those of battery module 320a. Components of battery modules 320b, 320c are denoted by reference numerals corresponding to those used above in the description of battery module 320a, wherein the trailing "a" has been replaced with a trailing "b" or a trailing "c", respectively, and the components of battery modules 320b, 320c can have features corresponding to those of components of battery module 320a.

Similar to the battery 200 described above with reference to FIG. 2, the battery 300 can comprise a control unit 318, and a current sense module 331 having features corresponding to those of control unit 218 and current sense module 231 described above.

In the following, the operation of a battery in accordance with some embodiments of the present disclosure will be described. Although, in the following, we will generally refer to FIG. 3, showing a battery wherein each battery module comprises one switchable submodule 303a, 303b, 303c and a plurality of non-switchable submodules 301a, 302a, 301b, 302b, 301c, 302c, a battery wherein each submodule is a switchable submodule, as shown in FIG. 2, can be operated in substantially the same or a similar manner.

The control unit 318 can be configured for measuring a voltage and/or a state of charge of cells in each of the battery modules 320a, 320b, 320c. In some embodiments, the control unit 318 can measure a voltage of each of the cells 301a, 302a, 303a, 301b, 302b, 303b, 301c, 302c, 303c. In other embodiments, the control unit 318 can measure a total voltage of the cells in each of the battery modules 320a, 320b, 320c.

For determining the total voltage of the cells of battery module 320a, the control unit 318 can measure a voltage between a positive terminal 340a and a negative terminal 341a of the battery module 320a when the submodule switching circuit 305a is in the first state, such that the cells of all submodules 301a, 302a, 303a of battery module 320a are electrically connected in series between the positive terminal 340a and the negative terminal 341a. Similarly, the total voltage of the cells in battery module 320b can be determined by measuring a voltage between a positive terminal 340b and a negative terminal 341b of the battery module 320b when the submodule switching circuit 305b is in the first state, and the total voltage of the cells of battery module 320c can be determined by measuring a voltage between positive terminal 340c and negative terminal 341c when the submodule switching circuit 305c is in the first state.

The control unit 318 can then select a subset of the battery modules 320a, 320b, 320c on the basis of the determined total voltage of the cells of the battery modules 320a, 320b, 320c.

In some embodiments, the selected subset of the battery modules 320a, 320b, 320c can comprise one of the battery modules 320a, 320b, 320c. In other embodiments, the subset can comprise more than one battery module.

In some embodiments, the selected subset can comprise one or more battery modules wherein the total voltage of the cells of the battery module(s) in the subset is greater or smaller than the total voltage of the cells of the other battery modules in battery 300.

In some of these embodiments, the selected subset can comprise battery modules whose voltage is outside a determined range, in particular above or below a determined threshold value that is determined on the basis of the voltages of battery modules 320a, 320b, 320c. For example, the selected subset can comprise battery modules whose voltage is smaller than X percent of the average voltage of battery modules 320a, 320b, 320c, wherein X is a number smaller than 100%, or the subset can comprise battery modules whose voltage is greater than Y percent of the average voltage of battery modules 320a, 320b, 320c, wherein Y is a number greater than 100%.

In other embodiments, the selected subset can comprise battery modules whose voltage is outside a fixed voltage range. For example, the selected subset can comprise battery modules whose voltage is lower than a fixed lower threshold voltage, or battery modules whose voltage is greater than a fixed upper threshold voltage. The upper and the lower threshold value can be representative of an allowable voltage range for cells of the type used in the battery 300.

The subset need not be selected on the basis of the total voltage of battery modules 320a, 320b, 320c. Instead, the subset can comprise one or more battery modules that comprise one or more cells having a voltage that is outside a voltage range. For example, the control unit 318 can determine the voltage of each of the cells of the battery 300, and can then select each battery module that comprises a cell having a voltage that is greater or smaller than an upper or lower threshold value. Similar to embodiments wherein the total voltage of battery modules 320a, 320b, 320c is used, as described above, the threshold values can be fixed threshold values, or can be determined on the basis of voltages of cells of the battery 300, for example on the basis of an average voltage.

In still further embodiments, the control unit 318 can determine a state of charge of each of the battery modules 320a, 320b, 320c on the basis of measured voltages of individual cells in the battery modules 320a, 320b, 320c. In some embodiments, the control unit 318 may employ a known relationship between the voltage and the state of charge of a cell of the type used in the battery 300 to determine the state of charge of each cell in each battery module, and then determine a sum or average of the state of charge of the individual cells in the respective battery module. Thereafter, a subset of the battery modules 320a, 320b, 320c which have a state of charge that is smaller than or greater than a threshold value can be selected, wherein the threshold value can be a fixed threshold value, or can be determined on the basis of the average state of charge of cells in the battery 300.

The control unit 308 can operate the submodule switching circuits of one or more switchable submodules in the selected subset of the battery modules 320a, 320b, 320c for performing a charge balancing process.

In some embodiments, the control unit 318 can operate the submodule switching circuits of switchable submodules in each battery module in the selected subset of the battery modules 320a, 320b, 320c for lowering the state of charge of the cells of the battery modules in the subset to a smaller extent than that of other battery modules during a discharge process. Thus, the state of charge of the cells of the battery modules in the subset can be increased relative to cells in other battery modules, although the absolute state of charge of cells may decrease in each battery module during the discharge process. This can be done if the subset comprises battery modules whose total voltage and/or total state of charge, or voltage and/or state of charge of individual cells in the battery module is below a fixed or determined threshold value, as described above.

For example, if the selected subset of the battery modules 320a, 320b, 320c comprises the battery module 320a, the state of charge of the battery module 320a can be increased in comparison that of battery modules 320b, 320c by switching the submodule switching circuit 305a into the second state, and by switching the submodule switching circuits 305b, 305c of the other battery modules 320b, 320c into the first state during a discharge process of the battery 300. Thus, in the battery module 320a, only the cells of non-switchable submodules 301a, 302a are discharged, whereas in the other battery modules 320b, 320c, the cells of all submodules are discharged. The cell(s) of the submodule 303a is/are electrically disconnected from the stack of cells of the battery 300 and are electrically bypassed, and thus maintain their state of charge. The charge balancing circuit 330a can simultaneously or later be used for equalizing the state of charge among the cells in the submodules 301a, 302a, 303a of the battery module 320a.

If the submodule switching circuit 305a of the battery module 320a is switched into the second state during a charge process of the battery 300, whereas the submodule switching circuits 305b, 305c of the battery modules 320b, 320c are maintained in the first state, the charging current applied between poles of the battery 300 flows into each cell of the battery modules 320b, 320c, whereas in the battery module 320a, only the cells of non-switchable submodules 301a, 302a are charged and the cell(s) of the submodule 303a maintain(s) its/their state of charge. Hence, the battery module 320a is charged to a smaller extent than the battery modules 320b, 320c. This can be done if the voltage and/or state of charge of cells in the battery module 320a is above a fixed or determined threshold value, as described above. The battery balancing circuit 330a can simultaneously or later be used for equalizing the state of charge among the cells in the individual submodules 301a, 302a, 303a of battery module 320a.

More generally, submodule switching circuits of a subset of the battery modules 320a, 320b, 320c whose total voltage and/or state of charge, or voltage and/or state of charge of individual cells in the respective battery module, is below a threshold value, as described above, can be switched into the second state while the battery is charged, for providing a smaller increase of the state of charge of the battery modules in the subset. Thus, the state of charge of the battery modules in the subset is decreased relative to that of other battery modules, although the absolute state of charge of the battery modules in the subset may still increase.

In embodiments wherein each battery module comprises a plurality of switchable submodules, the submodule switching circuits of submodules in a battery module belonging to the selected subset can alternately operate for electrically disconnecting the cells of one of the submodules of the battery module from the stack and bypassing these cells.

For example, in a battery that comprises a plurality of battery modules electrically connected in series, each having features similar to those of the battery module 220 described above with reference to FIG. 2, the control unit can alternately operate the submodule switching circuits 205a, 205b of a first submodule 201a and the second submodule 201b for switching one of the submodule switching circuits 205a, 205b into the first state and the other submodule switching circuit into the second state. Thus, the state of charge of the cells of each of the submodules 201a, 201b can be decreased or increased relative to cells in submodules of other battery modules in the battery. This may reduce the amount of charge transferred between the cells of different submodules in the battery module by means of battery balancing circuit 230 for equalizing the state of charge of the cells of the battery modules in the selected subset of the battery modules in comparison to embodiments wherein only a part of the submodules can be bypassed.

In some embodiments wherein each submodule of each battery module is a switchable submodule, battery balancing circuits such as battery balancing circuit 230 and battery balancing circuits 330a, 330b, 330c can be omitted, and charge balancing can be performed only by switching the submodule switching circuits of submodules whose cells have a relatively low voltage or state of charge into the second state during a discharge process of the battery, and by switching submodule switching circuits of submodules that have a particularly high voltage and/or state of charge into the second state during the charge process of the battery.

As detailed above, in a battery according to the present disclosure, the state of charge of a subset of the battery modules can be increased relative to that of other battery modules during a discharge process, and can be decreased relative to that of other battery modules during a charge process. However, as will be described in the following, a relative increase of the state of charge of a subset of the battery modules can also be obtained during a charge process, and a relative decrease of the state of charge of a subset of the battery modules can also be obtained during a discharge process.

For example, for relatively increasing the state of charge of battery module 320a relative to battery modules 320b, 320c during a charge process of the battery 300, the submodule switching circuit 305a can be switched into the first state, while the submodule switching circuits 305b, 305c of the battery modules 320b, 320c are switched into the second state. Thus, in the battery module 320a, the charging current flows into each of the cells of battery module 320a, whereas in battery modules 320b, 320c, the charging current flows only into the cells of non-switchable submodules 301b, 302b, and 301c, 302c, respectively. Thus, battery modules 320b, 320c receive a smaller amount of charge than battery module 320a. For equalizing the state of charge among the cells of battery module 320b, the battery balancing circuit 330b can be used, and for equalizing the state of charge among the cells of battery module 320c, the battery balancing circuit 330c can be employed.

More generally, switchable submodules of a second subset of the battery modules 320a, 320b, 320c of the battery 300, which, in the above example, comprises battery modules 320a, 320b, can be switched from the first state into the second state during a charge process, for relatively increasing the amount of charge provided to a first subset of the battery modules which, in the above example, comprises battery module 320a in comparison to the amount of charge provided to the battery modules of the second subset. This can be done if the voltage and/or state of charge of the battery modules in the first subset, or the voltage or state of charge of individual cells in the subset, is below a fixed or determined threshold value.

The present disclosure is not limited to embodiments wherein the first subset comprises a single battery module, and the second subset comprises the remaining battery modules of the battery 300. Alternatively, the first subset can comprise two or more of the battery modules of the battery 300.

During a discharge process of the battery 300, at least one switchable submodule of a second subset of the plurality of battery modules 320a, 320b, 320c can be switched from the first state into the second state for reducing the state of charge of battery modules in a first subset (wherein members of the first subset are not in the second subset) relative to the battery modules in the second subset. This can be done if the voltage and/or state of charge of the battery modules in the first subset is above a fixed or determined threshold value.

For example, if the state of charge of cells in the battery module 320*a* is to be reduced relative to the other battery modules 320*b*, 320*c*, the switching circuits 305*b*, 305*c* of battery modules 320*b*, 320*c* can be switched into the second state. Thus, in battery module 320*a*, all cells are discharged, whereas in battery modules 320*b*, 320*c*, only the cells in the non-switchable submodules 301*b*, 302*b*, 301*c*, 302*c* are discharged. Hence, the state of charge of the cells in the battery module 320*a* is reduced to a greater extent than the state of charge of the cells in battery modules 320*b*, 320*c*.

In embodiments wherein each of the battery modules comprises a plurality of switchable submodules, the submodule switching circuits in each of the battery modules of the second subset can alternately be switched into the second state, such that in each battery module, at each point of time, the submodule switching circuit of one submodule is in the second state. Thus, the amount of charge transferred or dissipated within the battery modules by means of battery balancing circuits 230, 330*a*, 330*b*, 330*c* can be reduced, or battery balancing circuits 230, 330*a*, 330*b*, 330*c* can even be omitted.

In embodiments wherein each of the submodules of each battery module of the battery comprises a submodule switching circuit, such as, for example in the battery 200 described above with reference to FIG. 2, the control unit 218 can be adapted for detecting a short circuit condition of the battery 200. For this purpose, the control unit 218 can measure a current flowing through the battery 200, for example by means of current sense module 231. If the current is greater than a predetermined threshold value, a short circuit between the poles 216, 217 of the battery 200 is considered to be present.

If a short circuit is detected, the control unit can switch the submodule switching circuits 205*a*, 205*b* of each submodule in each battery module of the battery 200 into the second state. Thus, all cells of the battery are electrically disconnected from the poles of the battery 200, such that further current flow is prevented. Thus, adverse effects of short circuiting the battery 200 can be avoided.

In the following, charge balancing circuits that can be used as charge balancing circuit 230 (FIG. 2) and/or charge balancing circuits 330*a*, 330*b*, 330*c* (FIG. 3) will be described.

Figure 4:
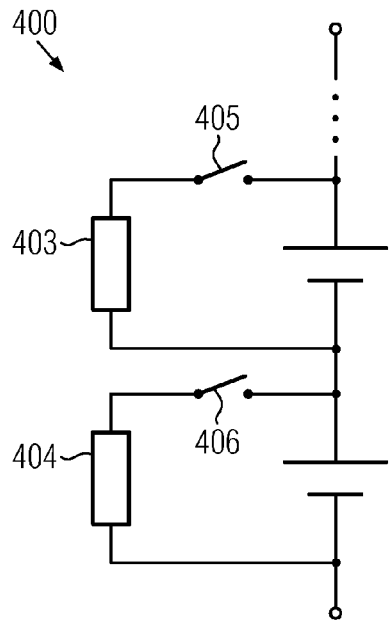
FIGS. 4, 5, 6, and 7 show schematic circuit diagrams of battery balancing circuits that can be used in embodiments of the present disclosure.

FIG. 4 shows a schematic circuit diagram of a passive charge balancing circuit 400.

The balancing circuit 400 comprises a plurality of bypass resistors 403, 404 and switches 405, 406. The switches 405, 406 can be solid state switches, each comprising one or more transistors, and can be operated by control unit 218 or control unit 318.

By closing a respective one of the switches 405, 406, each of the bypass resistors 403, 404 can be connected between the poles of one of the cells of the battery module. If this is done while the battery module is charged, a part of the current applied to the battery module flows through the respective bypass resistor instead of flowing into the cell, such that the cell is charged to a smaller extent than it would be if the switch were open. If one of switches 405, 406 is closed while the battery module is discharged, or while the battery module is idle, a current can flow between the positive and the negative pole of the cell connected to the respective switch through a respective one of the bypass resistors 403, 404, such that the cell is discharged. In either case, by closing one of the switches, the amount of charge in the cell connected thereto is reduced compared to a case wherein the switch is open. Thus, the charge of the cells can be balanced by closing switches associated with cells having a particularly high state of charge, for selectively reducing the amount of charge stored in these cells relative to the charge of other cells.

Passive charge balancing leads to a loss of energy, since energy is converted to heat in the bypass resistors 403, 404. Passive charge balancing circuits can be used, in particular, in embodiments wherein each submodule is a switchable submodule, since in such embodiments, relatively small differences of the state of charge between the submodules may occur, such that relatively small amounts of energy can be dissipated by means of resistors 403, 403.

For avoiding or at least reducing a loss of energy in the charge balancing process, active balancing wherein charge and energy are transferred between the cells of a battery module can be used. Active balancing can be particularly advantageous in embodiments wherein not all of the submodules are switchable, since in such embodiments, greater differences in the state of charge between the submodules can occur. However, active balancing may also be employed in embodiments wherein all submodules are switchable.

An active battery balancing circuit 500 will be described with reference to FIG. 5. The balancing circuit 500 comprises a capacitor 501 and switches 502, 503. Similar to the switches 405, 406 described above with reference to FIG. 4, the switches 502, 503 can be solid state switches, and can be operated by control unit 218 or control unit 318.

Figure 5:
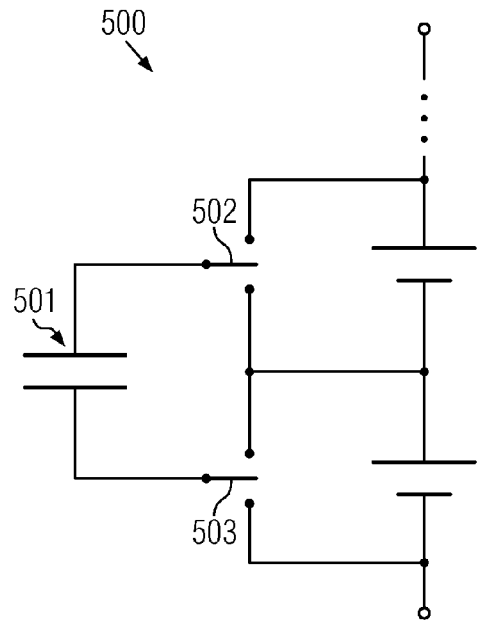

One of the terminals of the capacitor 501 can alternatively be connected to the positive pole and the negative pole of the upper cell as shown in FIG. 5 by operation of the switch 502, and the other terminal of the capacitor 501 can alternatively be connected to the positive and negative pole of the lower cell shown in FIG. 5 by operating the switch 503. Please note that the terms "upper cell" and "lower cell" only relate to the arrangement in the circuit diagram, and are used only for describing the figures. Similar arrangements of capacitors and switches can be provided between other pairs of cells in the battery module. In the balancing circuit 500, energy and charge can be transferred from a cell of the battery module to capacitor 501 and from capacitor 501 to another cell having a lower voltage.

As an example, a case will be described wherein the upper cell has a higher voltage than the lower cell 102. First, the switches 502, 503 are operated such that the capacitor 501 is connected between the positive and the negative pole of the upper cell. In doing so, the capacitor 501 is charged to approximately the voltage between the poles of the upper cell. Thereafter, the switches 502, 503 are operated such that the capacitor 501 is connected between the poles of the lower cell. Since the voltage of the lower cell is smaller than the voltage of the upper cell, and the capacitor 501 has been charged to the voltage of the upper cell, the capacitor 501 now has a higher voltage than the lower cell, such that charge from the capacitor 501 is flowing into the lower cell until the voltage of the capacitor 501 equals the voltage of the lower cell. Thereby, the upper cell is partially discharged, and the lower cell is charged. Subsequently, the process can be repeated.

Figure 6:
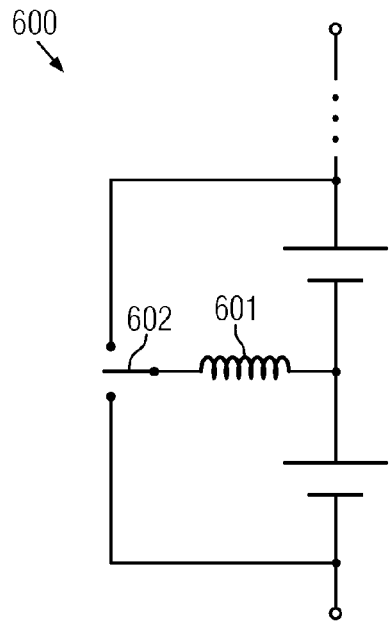

FIG. 6 shows another active battery balancing circuit 600. The balancing circuit 600 comprises an inductivity 601, for example a coil, and a switch 602 that can, for example, be a solid state switch operated by control unit 218 or control unit 318. By operating the switch 602, the inductivity 601 can alternatively be connected between the poles of the upper cell and the poles of the lower cell. Similar circuitry comprising an inductivity and a switch can be provided between other pairs of cells in the battery module.

For transferring energy and charge from a first one of the cells of the battery module to a second one of the cells of the battery module, the switch 602 can be operated for connecting the coil 601 between the poles of the first cell. Thus, an electric current through the inductivity 601 begins to flow between the poles of the first cell. The current increases with time, and an increasing magnetic field is built up in the inductivity 601. Thereafter, the switch 602 is operated for connecting the inductivity 601 between the poles of the second cell. Since energy is stored in the magnetic field in the inductivity 601, an electric current continues to flow through the inductivity 601. Since the inductivity 601 is now connected to the second cell, this current is flowing into the second cell. Hence, the cell with the higher voltage can be discharged with a current and the cell with the lower voltage can be charged with that current.

Figure 7:
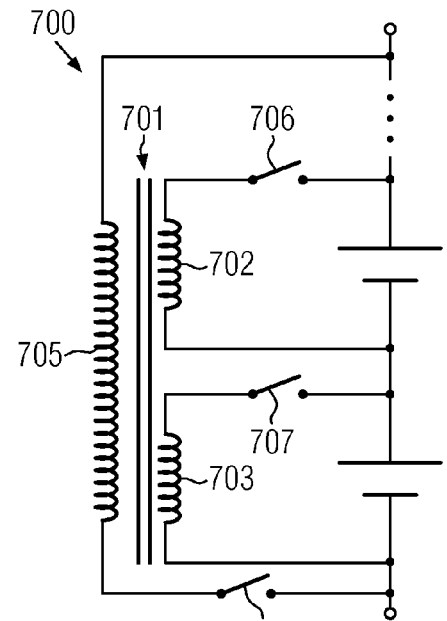

FIG. 7 shows yet another active battery balancing circuit 700.

The balancing circuit 700 comprises a transformer 701 having a primary winding 705 and a plurality of secondary windings 702, 703 that are wound around a common core. The primary winding 705 can be connected between the positive pole and the negative pole of the entire battery module by means of switch 708. The secondary windings 702, 703 can each be connected between the positive and negative pole of one of the cells of the battery module, and disconnected therefrom by means of a respective switch 706, 707. The switches 706, 707, 708 can be solid state switches, and can be controlled by control unit 218 or control unit 318.

The balancing circuit 700 can be used for selectively charging one of the cells, for example the cell having the lowest voltage. For this purpose, the switch 708 is closed while the switches 706, 707 are open. Thus, an electric current flows from the entire battery module through the primary winding 705 of the transformer 701, and a magnetic field is built up in the core of the transformer 701. Thereafter, the switch 708 is opened, and a switch associated with the cell to be charged, for example, the switch 706 associated with the upper cell shown in FIG. 7, is closed. The energy stored in the magnetic field in the core of the transformer 701 creates a current in the secondary winding 702 that flows into the cell. Thus, the cell is charged, and the charge in the other cells of the battery module is reduced.

Alternatively, the balancing circuit 700 can be used for selectively discharging one of the cells of the battery module, for example the cell having the highest voltage, and charging the entire battery module with charge drawn from this cell. For example, for selectively discharging the lower cell shown in FIG. 7, the switch 707 can be closed, with the switches 706, 708 being open. A current flows from the cell through the secondary winding 703, and creates a magnetic field in the core of the transformer 701. Then, the switch 707 is opened, and the switch 708 is closed. The presence of the magnetic field in the core of the transformer 701 creates an electric current in the primary winding 705 of the transformer 701, and the energy stored in the magnetic field flows into the entire battery module.

Thus, the balancing circuit 700 allows to selectively discharge cells of the battery module having a high voltage, for example during the charging of the battery module, and to selectively charge cells of the battery module having a low voltage, for example during the discharge of the battery module.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A battery, comprising:
    a first battery module that includes a first plurality of submodules electrically connected to each other, each submodule including a first submodule terminal, a second submodule terminal, and a cell, wherein:
        the submodules include a first switchable submodule that includes a first submodule switching circuit, the first submodule switching circuit being configured to be switched between a first state and a second state;
        the first submodule switching circuit is configured to electrically couple the cell of the first switchable submodule between the first and second submodule terminals of the first switchable submodule when the submodule switching circuit is in the first state;
        the first submodule switching circuit is configured to provide an electrical bypass connection between the first and second submodule terminals of the first switchable submodule and electrically decouple the cell of the first switchable submodule from at least one of the first and second submodule terminals of the first switchable submodule when the first submodule switching circuit is in the second state; and
        the first battery module comprises a battery balancing circuit configured to balance a state of charge of the cells of the first plurality of submodules of the first battery module, the battery balancing circuit including an active charge balancing circuit configured to temporarily store energy from one or more of the cells of the submodules of the first battery module and to pass the stored energy to one or more other ones of the cells of the submodules of the first battery module;
    a control unit configured to operate the first submodule switching circuit.

2. A battery according to claim 1, wherein the first submodule switching comprises:
    a first field effect transistor having a gate, a source electrically coupled to the second submodule terminal of the switchable submodule and a negative pole of the cell of the switchable submodule, and a drain electrically coupled to the first submodule terminal of the switchable submodule; and
    a second field effect transistor having a gate, a source electrically coupled to the first submodule terminal of the switchable submodule, and a drain electrically coupled to a positive pole of the cell of the switchable submodule;
    wherein the control unit is configured to operate the first and second field effect transistors by applying a first gate voltage to the gate of the first field effect transistor and a second gate voltage to the gate of the second field effect transistor.

3. A battery according to claim 1, wherein the submodules include a non-switchable submodule, the cell of the non-switchable submodule being electrically coupled between the first and second submodule terminals of the non-switchable submodule.

4. A battery according to claim 1, wherein each of the submodules is a switchable submodule.

5. A battery according to claim 4, wherein the control unit is configured to detect a short circuit between poles of the battery, and switch the first switchable submodule into the second state in response to detecting the short circuit.

6. A battery according to claim 1, comprising a second battery module that includes a second plurality of submodules electrically connected to each other, each submodule of the second plurality including a first submodule terminal, a second submodule terminal, and a cell, wherein
  the submodules of the second plurality include a second switchable submodule that includes a second submodule switching circuit, the second submodule switching circuit being configured to be switched between the first state and the second state;
  the second submodule switching circuit is configured to electrically couple the cell of the second switchable submodule between the first and second submodule terminals of the second switchable submodule when the second submodule switching circuit is in the first state;
  the second submodule switching circuit is configured to provide an electrical bypass connection between the first and second submodule terminals of the second switchable submodule and electrically decouple the cell of the second switchable submodule from at least one of the first and second submodule terminals of the second switchable submodule when the second submodule switching circuit is in the second state; and
  the control unit is configured to switch at least one of the first and second switchable submodules from the first state into the second state if a voltage and/or a state of charge of cells in the battery is greater than a first threshold value during a charge process of the battery or is smaller than a second threshold value during a discharge process of the battery.

7. A battery according to claim 1, wherein:
  the first battery module is one of a plurality of battery modules that each includes a corresponding plurality of submodules electrically connected to each other, each submodule of the corresponding plurality including a first submodule terminal, a second submodule terminal, and a cell;
  the plurality of battery modules includes first and second subsets of battery modules, the first subset including battery modules that are not part of the second subset;
  the submodules of the corresponding plurality include a corresponding switchable submodule that includes a corresponding submodule switching circuit, the corresponding submodule switching circuit being configured to be switched between the first state and the second state;
  the corresponding submodule switching circuit is configured to electrically couple the cell of the corresponding switchable submodule between the first and second submodule terminals of the corresponding switchable submodule when the corresponding submodule switching circuit is in the first state;
  the corresponding submodule switching circuit is configured to provide an electrical bypass connection between the first and second submodule terminals of the corresponding switchable submodule and electrically decouple the cell of the corresponding switchable submodule from at least one of the first and second submodule terminals of the corresponding switchable submodule when the corresponding submodule switching circuit is in the second state; and
  the control unit is configured to switch at least one switchable submodule of the second subset of battery modules from the first state into the second state if a voltage and/or a state of charge of cells of the first subset of battery modules is greater than a first threshold value during a discharge process of the battery or is smaller than a second threshold value during a charge process of the battery.

8. A battery according to claim 1, further comprising a current sense module configured to measure a current through the battery module, wherein the control unit is configured to operate the first submodule switching circuit of the first switchable submodule based on the measured current.

9. A battery according to claim 1, wherein the first submodule switching circuit comprises at least one switching element configured to electrically connect and disconnect the cell of the first switchable submodule from at least one of the first and second submodule terminals, the at least one switching element having a breakthrough voltage of that is smaller than a sum of the voltages of all cells of the battery in a charged state.

10. A method, comprising:
  operating a battery that includes a plurality of battery modules, each battery module includes a plurality of submodules electrically coupled to each other, each submodule comprising a first submodule terminal, a second submodule terminal, and at least one cell, the operating including:
    selecting a subset of the plurality of submodules of at least one of the battery modules;
    electrically decoupling the at least one cell of each submodule in the subset from at least one of the first and the second submodule terminal of the submodule;
    providing an electrical bypass connection between the first and second submodule terminals of each submodule in the subset; and
    for each battery module, balancing a state of charge of the cells of the plurality of submodules of the battery module using an active charge balancing circuit that temporarily stores energy from one or more of the cells of the submodules of the battery module and passes the stored energy to one or more other ones of the cells of the submodules of the battery module.

11. A method according to claim 10, further comprising:
  determining a voltage and/or a state of charge of each of the plurality of battery modules during a discharge process of the battery;
  wherein the selecting includes selecting the subset based on the determined voltage and/or state of charge, the subset including one or more battery modules having a voltage and/or state of charge that is lower than a threshold value.

12. A method according to claim 10, further comprising:
  determining a voltage and/or a state of charge of each of the plurality of battery modules during a charge process of the battery;
  wherein the selecting includes selecting the subset based on the determined voltage and/or state of charge, the subset including one or more battery modules having a voltage and/or state of charge that is higher than a threshold value.

13. A method according to claim 10, further comprising:
  detecting a short-circuit connection between a positive and a negative pole of the battery;
  wherein the selecting includes selecting the subset to comprise each cell in the battery in response to detecting the short-circuit connection.

* * * * *